Oct. 1, 1940.   J. M. WILKINS   2,216,150
LUBRICATED VALVE
Filed June 21, 1935   2 Sheets-Sheet 1

Inventor
James M. Wilkins.
By Cushman, Darby & Cushman
Attorneys

Oct. 1, 1940.                    J. M. WILKINS                    2,216,150
                                 LUBRICATED VALVE
                             Filed June 21, 1935            2 Sheets-Sheet 2
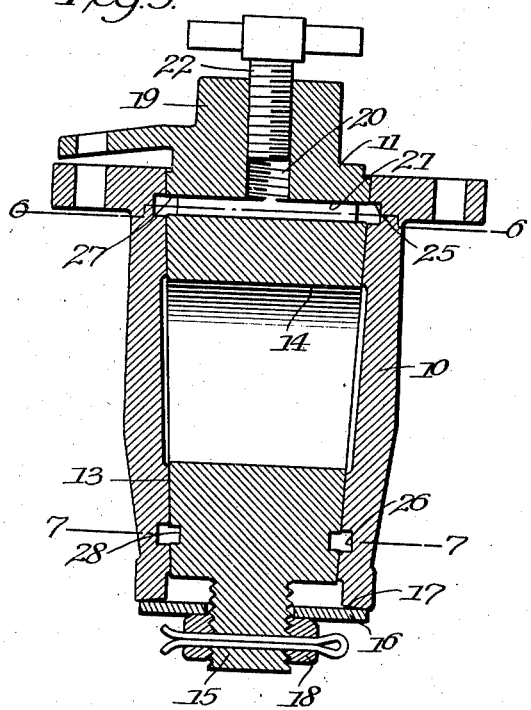
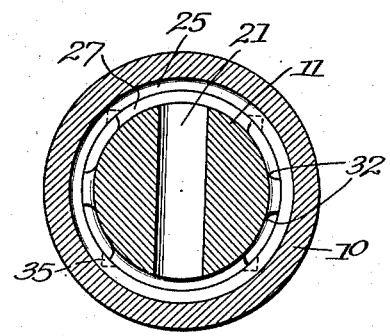
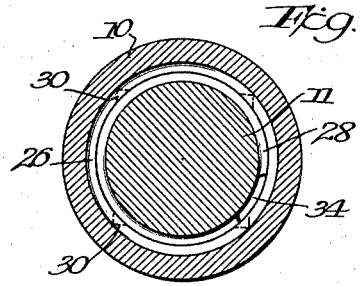
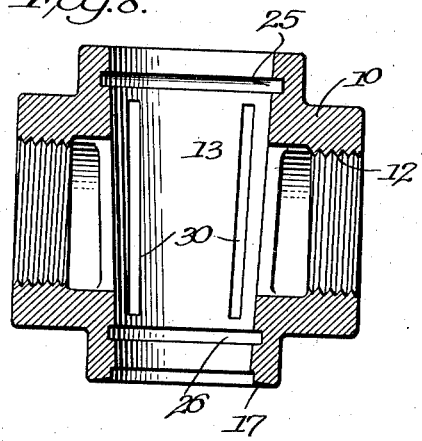
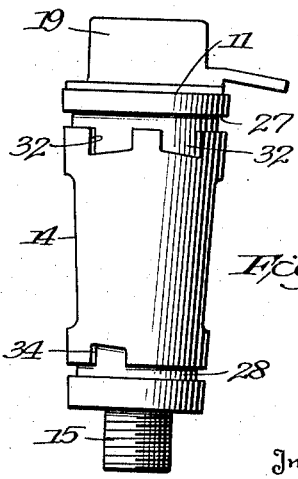
Inventor
James M. Wilkins
By Cushman, Darby & Cushman
Attorneys Patented Oct. 1, 1940

2,216,150

UNITED STATES PATENT OFFICE 2,216,150

LUBRICATED VALVE

James M. Wilkins, Decatur, Ill., assignor to Mueller Co., Decatur, Ill., a corporation of Illinois Application June 21, 1935, Serial No. 27,775

1 Claim. (Cl. 251—93)

The present invention relates to lubricated valves. The principal object of the invention is to provide a lubricated valve which includes an arrangement of lubricating passages of maximum simplicity and wherein the passages are so positioned with respect to each other that the valve is sealed against leakage by grease under pressure when the plug member is in both opened and closed positions, and which are also arranged in such a manner that at the moment during turning of the plug member when the port of the plug member is opened to one of the lubricant passages and also to the flow passageway of the casing member, the lubricant in the exposed lubricant passage will not be under pressure. The present valve also includes lubricant passages at each end of the plug member to prevent leakage.

Other objects and advantages of the invention will be apparent from the following drawings wherein Figure 1 is a longitudinal sectional view through the valve.

Figure 5 is a longitudinal sectional view on the line 5—5 of Figure 1.

Figure 6 is a transverse section on the line 6 of Figure 5.

Figure 7 is a transverse section on the line 7—7 of Figure 5.

Figure 8 is a longitudinal sectional view of the casing member, and

Figure 9 is an elevation of the plug member.

Figure 1:
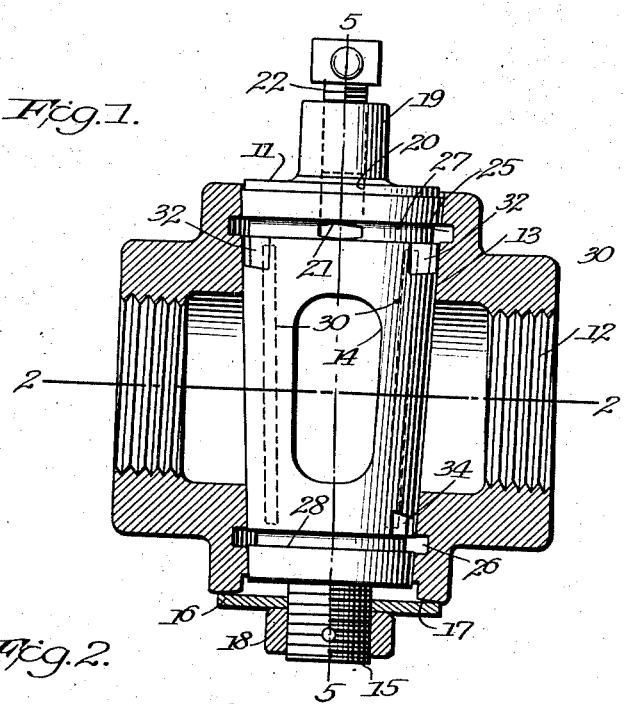

The numeral 10 designates the casing member of the valve and the numeral 11 indicates the plug member. The casing member 10 is provided with a flow passageway 12 for movement of fluid therethrough and a tapered seat 13 extends transversely of the passageway. The plug member 11 is of tapered form to fit the seat 13 and is provided with a port 14 which is adapted to be aligned with the flow passageway 12 in the casing member 10 when the plug member is turned to open position.

The plug member 11 preferably has an integral threaded stud 15 at its lower or smaller end and a flat washer 16 positioned upon this stud is held tightly against the lower surface 17 of the casing member 12, as shown in Figure 1, by a nut 18. By this arrangement, the plug member 11 is held properly seated in the seat 13. As is indicated in Figures 1 and 8, the surface 17 is inwardly and upwardly inclined. The washer 16 is preferably formed of metal having some degree of resiliency so that it may bend upwardly into the slight depression formed by the inclined surface 17 for a purpose hereinafter set forth.

It will be understood that the use of the terms "upper" and "lower" with respect to various parts of the valve is intended to be relative only and refers merely to the position of the valve as shown in the drawings.

As its larger end, the plug member 11 is provided with a stem 19 having a bore 20 extending axially thereof. The stem 19 may be flattened on one side to permit it to be turned, or it may be provided with an integral handle. The lower end of the bore 20 communicates with a transverse channel 21 and the upper end of the bore 20 is threaded to receive a set-screw or plunger 22 by means of which the grease in the passages of the valve may be maintained under proper pressure. It will be obvious that lubricant may be inserted in the bore upon removal of the plunger 22, and the reinsertion of the plunger will cause the lubricant to be placed under pressure.

The seating surface of the valve formed by the tapered seat 13 of the casing member and the seat face of the plug member 11 is provided with the arrangement of passages, grooves and channels hereinafter described to permit the lubricant to seal the seating surface.

The seat 13 of the casing member has a circumferential groove 25 extending thereabout at a point adjacent the upper end of the seat and a second circumferentially extending groove 26 is provided intermediate the lower end of the seating surface and the lower side of the flow passageway 12. The plug member 11 has a circumferential groove or passageway 27 therein arranged opposite the upper casing member groove 25, groove 27 being in communication with the transverse channel 21. The plug member is likewise provided with a circumferential groove 28 positioned opposite the lower circumferential groove 26 of the casing member.

Figure 2:
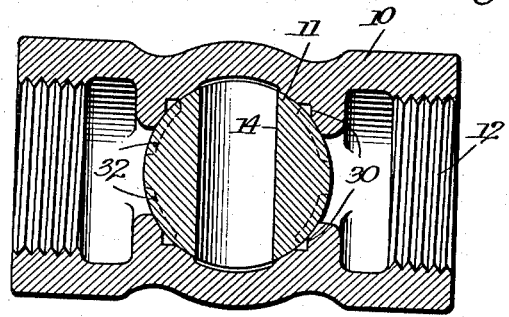
Figure 2 is a transverse section on the line 2—2 of Figure 1 showing the plug member in closed position.
Figure 4:
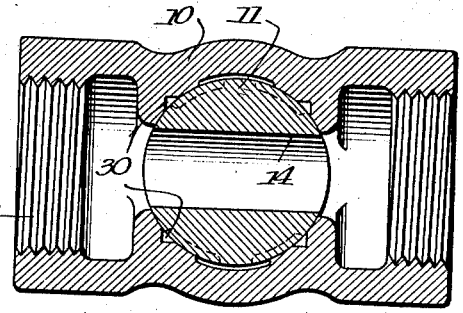
Figure 4 is a view similar to Figure 2 showing the plug member in opened position.

The seat 13 of the casing member is provided with four longitudinally or axially extending passages 30, spaced substantially 90° apart and one on each side of each mouth of the flow passageway 12. The longitudinal passages 30 are each of a length less than the distance between the circumferential grooves 27 and 28, so that the ends of the longitudinal passages terminate short of the circumferential passages. In order to permit lubricant to move between the circumferential passages and the longitudinal passages, the upper circumferential passage 27 of the plug member is provided with downwardly extending pockets or notches 32, four of these notches preferably being provided and the notches being spaced 90° apart and in such position that when the plug member is in either closed position as shown in Figure 2, or in opened position as shown in Figure 4 the notches will be aligned with the longitudinal passages 30 to permit flow of lubricant from the bore 22 through the channel 21 and opposed passages 27 and 25 to the longitudinal passages 30. Since the latter passages thus contain lubricant under pressure, there can be no leakage about the plug member.

The lower circumferential passage 28 of the plug member 11 is provided with one upwardly extending pocket or notch 34 which is so arranged that it will be in alignment with one of the longitudinal passages 30 when the plug member is in closed position and with an adjacent passage 30 when the plug member is in opened position. Lubricant may therefore flow from the passage 30 with which the lower notch 34 is aligned and to the opposed lower circumferential passages 26 and 28.

It will be observed from the above that when the plug member is in either opened or closed position, the grease in all of the passages will be under pressure by reason of the fact that the upper notches 32 are then aligned with the longitudinal passages 30 and one of the latter passages is aligned with the lower notch 34. It therefor results that leakage of fluid around the plug member 11 will be prevented and that leakage of fluid from the ends of the seating surface will be prevented by the circumferential passageway provided at the upper and lower ends of the seating surface. Grease will of course work from the passageways to fill any slight depressions in the seating surface and to form a perfect seal over the entire area of the seating surface.

Figure 3:
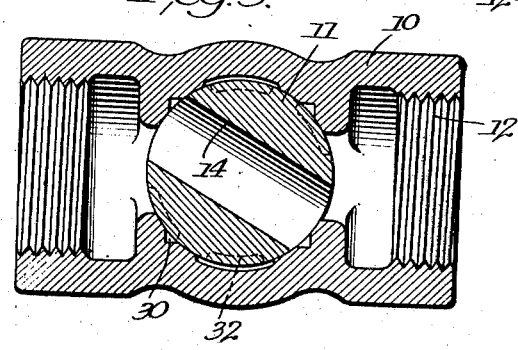
Figure 3 is a view similar to Fgure 2 showing the plug member in partly opened or intermediate position.

During movement of the plug member from opened to closed position, or vice versa, the port 14 of the plug member 11 will be momentarily aligned with two of the longitudinal passageways 30 as shown in Figure 3 and also with one edge of each mouth of the flow passageway 12 in the casing member. However, when the plug member is in this position, none of the notches 32 nor notch 34 will be aligned with any of the longitudinal passageways 30. Because of this, the grease in the longitudinal passages which are exposed to the flow passageway will not be under pressure and hence will not be forced int the plug member port or casing member passage way. Waste of lubricant will thus be prevented Should the valve become seized, it may be re leased for rotation by moving the plunger 2! further inwardly to exert greater pressure upor the grease in the passages, thereby lifting the plug-member 11 slightly from the seat 13. Such lifting of the plug member will be permitted by the resilient washer 16 and the inclination of the surface 17 against which it bears. The circumferential passages 25 and 27 and 26 and 28 are of sufficient width that a substantial portion of the passages of each pair will be opposed when the plug is lifted against the action of the resilient washer 16.

It will be understood that the invention is not limited to the details of construction shown in the drawings and described in the specification and that the example of the use of the device which has been given does not include all of the uses of which it is capable; also, that the phraseology employed in the specification is for the purpose of description and not of limitation.

I claim:

A gas valve comprising a casing member having a passageway for flow of fluid and a tapered seat formed transversely of the passageway and extending entirely through the casing member, a tapered plug member rotatably disposed in the seat and having a fluid port therethrough, the seating surface formed by the seat of the casing member and the opposed face of the plug member having respectively opposed circumferential passages therein on each side of and spaced from and between the fluid passageway and the ends of the seating surface, passages extending axially of the seating surface of the casing member on each side of the passageway, all of said passages being spaced from and out of communication with each other, and means to place the axial passages in communication with the circumferential passages when the plug member is in opened or closed position comprising a notch in the plug member to place one end of each of the axial passages in communication with one of the circumferential passages and a single notch in the plug member placing the other end of one of the axial passages in communication with the other circumferential passage, the axial and the respective circumferential passages being out of communication during intermediate positions of the plug member, and means to supply lubricant directly to the circumferential passage at the larger end of the plug member, and means to retain the plug member in the seat.

JAMES M. WILKINS.